United States Patent [19]

Ashina et al.

[11] Patent Number: 4,582,936

[45] Date of Patent: Apr. 15, 1986

[54] PROCESS FOR PRODUCING DIMETHYLAMINE IN PREFERENCE TO MONO- AND TRIMETHYLAMINES BY GAS PHASE CATALYTIC REACTION OF AMMONIA WITH METHANOL

[75] Inventors: Yoshiro Ashina, Zushi; Takeyuki Fujita, Yokosuka; Michio Fukatsu; Junsuke Yagi, both of Yokohama, all of Japan

[73] Assignee: Nitto Kagaku Kogyo Kabushiki Kaisha, Tokyo, Japan

[21] Appl. No.: 617,636

[22] Filed: Jun. 6, 1984

[30] Foreign Application Priority Data

Jun. 8, 1983 [JP] Japan .................................. 58-100949

[51] Int. Cl.$^4$ ............................................. C07C 85/06
[52] U.S. Cl. .................................... 564/479; 564/480; 502/77; 502/67; 502/64; 502/78; 502/85
[58] Field of Search ............... 564/479, 480, 469, 463; 585/481, 475; 502/77, 67, 64, 78, 85

[56] References Cited

U.S. PATENT DOCUMENTS

| | | | |
|---|---|---|---|
| 4,231,899 | 11/1980 | Chen et al. | 502/86 |
| 4,251,676 | 2/1981 | Wu | 585/486 |
| 4,254,061 | 3/1981 | Weigert | 564/480 |
| 4,300,012 | 11/1981 | Tu et al. | 585/475 |
| 4,313,003 | 1/1982 | Weigert | 564/463 |
| 4,326,994 | 4/1982 | Haag et al. | 502/77 |
| 4,374,296 | 2/1983 | Haag et al. | 502/77 |
| 4,398,041 | 8/1983 | Cochran et al. | 564/479 |

*Primary Examiner*—Paul F. Shaver
*Attorney, Agent, or Firm*—Robert E. Burns; Emmanuel J. Lobato; Bruce L. Adams

[57] ABSTRACT

A process for the selective production of dimethylamine in preference to mono- and trimethylamines by a catalytic vapor phase reaction of ammonia and methanol over a zeolite selected from mordenite, clinoptilolite and erionite is disclosed, wherein the improvement is characterized by the fact that the zeolite used has been contacted with steam at a temperature of 250° to 700° C.

8 Claims, No Drawings

PROCESS FOR PRODUCING DIMETHYLAMINE IN PREFERENCE TO MONO- AND TRIMETHYLAMINES BY GAS PHASE CATALYTIC REACTION OF AMMONIA WITH METHANOL

BACKGROUND OF THE INVENTION

1. Field of the Art

This invention relates to a process for producing dimethylamine by the gas phase catalytic reaction of methanol and ammonia. More specifically, the present invention relates to a process for producing dimethylamine having a specific feature in the catalyst employed, namely the type and the pretreatment of the catalyst.

Dimethylamine is an important chemical intermediate as the starting material for various solvents, pharmaceuticals, organic rubbers, surfactants, dyeing aids, etc., and is generally produced by reacting methanol with ammonia in gas phase at an elevated temperature (around 400° C.) in the presence of a solid acid catalyst (hereinafter called the conventional catalyst) having dehydration and amination action such as γ-alumina, silica, silica-alumina and thoria. In this reaction, other than dimethylamine (hereinafter abbreviated DMA), monomethylamine (hereinafter abbreviated MMA) and trimethylamine (hereinafter abbreviated TMA) are also produced almost inevitably, and these by-product amines, for which demand is less than that for DMA, are separated from the reaction product and then transferred to the reaction system for reutilization.

Dimethylamine is separated from the reaction product of methylamines by distillation. However, since TMA forms complicated azeotropic mixtures with ammonia, MMA and DMA, very cumbersome and large scale distillation operations are required, whereby the energy consumption in the DMA recovery process becomes very great. Examples of the recovery process are shown in detail in, for example, "Revised Complete Collection of Manufacturing Flow Chart" (published by Kagaku Kōgyō Co., Ltd., Apr. 25, 1978).

For realization of reduction in production cost of DMA and in the size of the device, it is critically important to suppress formation of the methylamines other than DMA (MMA, TMA), particularly TMA, to a minimum, thereby promoting formation of DMA. However, the final proportion of the three kinds of methylamines formed is governed by thermodynamic equilibrium, and the proportion of MMA and DMA formed will be higher as the temperature becomes higher, and the ratio N/C of the number of nitrogen atoms to the number of carbon atoms in the reaction mixture becomes higher, with the proportion of TMA becoming smaller. For example, when the reaction temperature is 400° C., and the ratio of ammonia to methanol is 1:1 (weight ratio), the equilibrium proportions of the respective amines formed calculated thermodynamically are 0.284 for MMA, 0.280 for DMA and 0.436 for TMA (weight ratio).

In the case where the above conventional catalyst is used, the MMA formation reaction or TMA formation reaction is relatively rapid, and therefore the proportion of DMA formed in the three kinds of methylamines throughout the entire reaction region will never surpass this equilibrium value. Thus, large amounts of MMA and TMA must always be recycled together with unreacted ammonia to the reaction system.

Various methods have been known for promotion or suppression of a specific amine among the three kinds of methylamines. For example, by varying the reaction conditions, the level of equilibrium itself can be shifted to control the yield in favor of a specific amine. Generally speaking, as the reaction temperature and the ratio (N/C) of the number of nitrogen atoms to the number of carbon atoms become higher, MMA and DMA will be more advantageously formed. However, as shown in Table 1 set forth hereinafter, the change in the DMA formation ratio at the equilibrium does not greatly depend on the change in the reaction temperature and N/C. At higher reaction temperatures, the amounts of impurities produced such as carbon dioxide, methane, formaldehyde, higher amines, etc., are increased. On the other hand, at higher ratios N/C, the amount of ammonia to be circulated is increased, resulting in enlargement of the apparatus. For the reasons given above, it is not recommended to use reaction conditions outside those generally employed, namely, a reaction temperature of 360° C. to 450° C. and N/C of 1.2 to 3.0.

2. Prior Art

The method of promoting formation of DMA by modifying chemically the conventional catalyst such as silica-alumina has been proposed. For example, Japanese Patent Publication No. 486/1970 discloses a method for improving the yield of DMA by the use of a catalyst based on the silica-alumina impregnated with a sulfide such as that of Re, Ag or Co.

In recent years, as the catalyst for producing a specific methylamine (e.g., MMA or DMA) with high selectivity, various zeolites have been coming to the fore of interest. Among them, mordenite type zeolites are also included. For example, Japanese Laid-Open Patent Publication No. 113747/1981 discloses a method for obtaining selectively MMA from ammonia and methanol with the use of various zeolites inclusive of mordenite. Also, Japanese Laid-Open Patent Publication No. 46846/1981 discloses a method for producing DMA from MMA with the use of the same catalyst as mentioned above. Japanese Laid-Open Patent Publications Nos. 148708/1979 and 104234/1980 disclose a method for promoting formation of primary and secondary amines from alcohol and ammonia by the use of the synthetic zeolite FU-1 produced from materials containing a quaternary ammonium salt. U.S. Pat. No. 4,082,805 discloses that primary and secondary amines are obtained preferentially from alcohol and ammonia by the use of the synthetic zeolite ZSM-5 and others.

In any of the methods employing such a zeolite as the catalyst, the proportions of MMA and DMA formed surpass the thermodynamic equilibrium values. This is probably due to the effect of the so-called molecular shape selectivity, resulting from selective blocking of molecules sterically expanded (TMA) at the fine pore inlets, since the sizes of the fine pores within the crystalline structure of zeolite are at the level of molecular sizes.

Zeolites exhibiting shape selectivity for the reaction to form methylamines from ammonia and methanol known in the art are inclusive of mordenite, erionite, clinoptilolite, zeolite A and other special synthetic zeolites. Among them, particularly mordenite is disclosed to have a marked effect of suppressing formation of TMA in Japanese Laid-open Patent Publication No. 169444/1982. Also, Japanese Patent Application No.

82768/1983 by the present inventors discloses a process for enhancing the reaction activity and the dimethylamine selectivity by controlling the alkali metal content in mordenite.

By such improvements, it has been made possible to reduce the production cost of dimethylamine to a great extent as compared with the process of the prior art using a conventional catalyst, but yet there remains room for further improvement in the aspect of selectivity, and development of a catalyst capable of affording higher DMA selectivity is constantly required.

SUMMARY OF THE INVENTION

In the light of the background art as described above, we have made various investigations for further enhancing DMA selectivity with the zeolite catalyst as mentioned above as the base, and consequently it has unexpectedly been found that DMA selectivity can be dramatically improved without marked lowering of activity by contacting the zeolite catalyst with steam before the DMA synthetic reaction. The present invention is based on this discovery.

Steam treatment of various spent catalysts for the purpose of decoking (including also removal of coking precursors) has been generally known for the catalysts to be used for the reaction under severe conditions, particularly such as cracking of hydrocarbons. However, such a treatment has no greater effect than an activating effect to make the activity and/or the selectivity of the spent catalyst close to those/that of the fresh or virgin catalyst so as to make the spent catalyst useful in reuse for the reaction. Also, such a treatment is carried out in most cases in combination with incineration, which is one of the main operations, and rarely practiced as a single operation.

In the prior art concerning methylamine synthesis as described above, some references are made to the effect of the amount of steam or the steam pressure during the synthetic reaction on the reaction, but there is no report about treatment of the zeolite catalyst in a steam atmosphere separately from the synthetic reaction. The above mentioned Japanese Patent Publication No. 486/1970 describes a steam treatment of the catalyst for methylamine synthesis. However, in this case, the catalyst material to be subjected to steam treatment is not a zeolite but a material based on amorphous silica gel which had been used as a catalyst before zeolite was introduced as a catalyst in methylamine synthesis, having no shape selectivity as possessed by zeolite, and therefore having low DMA selectivity. As far as we know according to a trace experiment we performed, no improvement of selectivity could be found. Further, it has also been found that steam treatment of the silica-alumina catalyst is not effective in improvement of selectivity, resulting only in marked lowering of activity (see Comparative Example 1 set forth hereinafter).

Steam treatment of the catalyst for methylamine synthesis according to the present invention is applicable for either fresh catalyst or the catalyst which has already been used for the reaction. In the case of the former, the DMA selectivity can be dramatically improved without great loss of activity, while in the latter case, the lowered activity can be restored to substantially the same extent as that of the original fresh or virgin catalyst simultaneously with dramatic improvement of the DMA selectivity. Such an effect can be said to be a surprisingly remarkable effect which cannot be expected from the technical knowledge relating to steam treatment of catalysts in general of the prior art.

The present invention provides an improvement to a process for production of dimethylamine by a gas phase reaction of ammonia and methanol over a zeolite as a catalyst selected from the group consisting of mordenite, clinoptilolite and erionite, which improvement comprises contacting previously and separately from the reaction of ammonia and methanol the catalyst with an atmosphere comprising steam at a temperature in the range of from 250° to 700° C.

The wording "separately from the reaction of ammonia and methanol" means that the steam treatment is not conducted at the same time as the dimethylamine synthesis reaction, and it is not essentially required to take out the catalyst from the reactor for dimethylamine synthesis and carry out the treatment in a separate treating vessel. In other words, steam treatment according to the present invention can be practiced on the fresh catalyst, which may be fed into the reactor or into a separate treating vessel, or on the catalyst already provided for use in the reaction in the reactor (by discontinuing supply of methanol and ammonia) or in a separate treating vessel.

The present process is substantially the same as conventional ones in which mordenite is used as a catalyst except for the steaming of the mordenite. Accordingly, the wording "reaction of ammonia and methanol" means a reaction of ammonia and methanol in the presence of a recycle of a methylamine mixture produced from the reaction which has taken place over the catalyst previously as well as a reaction of solely ammonia and methanol.

The atmosphere comprising steam to be used for the steam treatment of the catalyst can be steam itself (100% steam) or a mixture of steam with an inert gas (e.g., air, nitrogen, and helium). In the latter case, the ratio of steam to the inert gas is not critical in the present invention. In most cases, the former (namely 100% steam) is preferred. The steam pressure of the steam atmosphere can be 1 to 70 atm. A pressure lower than 1 atm. is not practical because of poor efficiency. The upper limit (70 atm.) is determined depending on the performance of the commercially practicable equipment (particularly the reactor for methylamine synthesis). Preferably, the steam pressure is 5 to 30 atm., more preferably 10 to 20 atm., most preferably around 15 atm.

Steam treatment of the present invention can be carried out at a temperature in the range of from 250° to 700° C., but a temperature of 500° C. or lower is preferable for the purpose of preventing loss of the crystalline structure of zeolite. The preferable temperature range is from 350° to 500° C., more preferably from 380° to 500° C., most preferably around 400° C.

The time for steam treatment according to the present invention will vary depending on the steam pressure and the steam treatment temperature, and may be shorter as these conditions become more severe. The steam treatment time can be generally 1 to 400 hours but, in consideration of the preferable ranges for the steam pressure and the steam treatment temperature, is preferably 10 to 30 hours, more preferably 15 to 25 hours, and most preferably around 20 hours.

In the present invention, a zeolite catalyst of any desired cation form can be utilized, provided that it is mordenite, clinoptilolite or erionite, but the most marked effect can be obtained when the present invention is practiced with a catalyst controlled to an alkali metal content of from 1 to 7 wt.% as calculated on the basis of the oxide thereof.

The reaction conditions for dimethylamine synthesis to be used in the present invention is not so markedly different from those used when a zeolite catalyst in general (one not subjected to steam treatment) is used. The reaction conditions can be a temperature of 250° to 500° C., a pressure of 1 to 50 atm., N/C of 0.2 to 6, and a space velocity of 360 to 18,000 $hr^{-1}$ as calculated based on the data under 1 atm. and 0° C. The reaction of ammonia and methanol is preferably conducted continuously from the commercial point of view.

The effectiveness and utility of the present invention can be illustrated by referring to various examples. For example, in the case where the reaction is carried out with the use of a certain kind of mordenite as the catalyst, a reaction temperature of 320° C., and an ammonia/methanol mixture of N/C 1.9 as a starting material, the proportion of the DMA among the three kinds of methylamines is 50.9 wt.%. In contrast, when the same catalyst, which has been contacted with steam at 400° C. under a steam pressure of 10 atm. for 10 hours before the reaction, is used as the catalyst, the proportion of the DMA formed is increased to 56.3%. The reduction of the reactivity in this case is very low, the methanol conversion being changed from 96.4% to 95.8% at SV of 2,000 $hr^{-1}$.

In the catalytic cracking process of petroleum over a catalyst comprising silica-alumina, for example, contact of steam with the catalyst may be a cause for activity deterioration. Also, in methylamine synthesis, when a steam treatment (sometimes referred to as steaming hereinafter) is applied to γ-alumina, which is one of the conventional catalysts, the activity is lowered to a great extent as shown in a Comparative Example set forth hereinafter, and the DMA selectivity cannot exceed the equilibrium value, thus exhibiting no positive effect. When the specific area and the pore size distribution were measured for this γ-alumina before and after steaming, the specific area after steaming was found to be reduced to a great extent, and the average pore size of around 50 Å was confirmed to be increased to near 100 Å by steaming. Thus, in the prior art catalyst, sintering is promoted by steaming to destroy the pores (particularly small pores), with the result that the surface area is reduced to lower the activity. Also, in this case, no change such as to have an effect on the selectivity of amines occurs.

Differing from such a conventional catalyst (or an equilibrium catalyst), the above zeolite is a crystalline aluminosilicate, which is a non-equilibrium catalyst exhibiting shape selectivity. The pores in this catalyst can be classified into the voids within the crystalline structure (pore sizes of about 5 Å, hereinafter called micropores) and the pores based on the interstices between the primary crystalline particles (about 10 Å to about 200 Å, hereinafter referred to as macropores). The shape selectivity occurs as a result of obstruction of passage of TMA molecules at the inlets for micropores. A methylamine synthetic reaction also occurs on the surfaces of macropores, where equilibrium reactions proceed to result in preferential formation of TMA, whereby the effect of shape selectivity is reduced. For the above mordenite catalyst, the ratio of the macropore surface area/total micropore surface area was measured before and after the steaming treatment at 400° C. and 10 atm., for 20 hrs. according to the low temperature gas absorption method of multipoint system BET. As a result, a ratio of about 12% before steaming was found to have been reduced to about 8% after steaming.

By reducing the ratio of the macrosurface participating in the reaction, the effect of shape selectivity can be emphasized to suppress formation to TMA. The effect of the present invention of improving the DMA selectivity by steaming of the zeolite catalyst can be partly explained by such a reduction in the macropore surface area or lowering in the macropore surface activity.

Also, according to the same principle, this effect seems to be limited not only to the zeolites defined in the present invention (mordenite, clinoptilolite, erionite), but also appears similarly in other zeolites exhibiting shape selectivity for methylamine synthesis (e.g., Zeolite A, ZSM-5 and FU-1).

DESCRIPTION OF THE PREFERRED EMBODIMENT

The present invention is further illustrated by Examples and Comparative Examples. Table 1 shows the equilibrium compositions of respective amines at respective temperatures. Comparative Example 1 shows the reaction results for γ-alumina before and after steaming, from which it can be clearly seen that the DMA selectivity is lower than the equilibrium value in any case, and the activity is greatly lowered by steaming.

In Examples 1 to 7, according to the process of the present invention, unused mordenite, clinoptilonite and erionite subjected to steaming under the conditions of 400° to 550° C., pressure of 5 to 15 kg/cm², and 8 to 72 hrs, respectively, were used as the catalyst, and the ammonia/methanol of N/C 1.9 was allowed to react under the conditions of 320° C. and SV of 1,000 to 5,000, and the results obtained were compared with those obtained when catalysts not subjected to steaming were used.

Such zeolite catalysts exhibit markedly higher DMA selectivity as compared with the conventional catalysts and maintain sufficiently high activities even at lower temperatures (300° to 360° C.). In particular, a mordenite controlled correctly in alkali metal content has high activity and DMA selectivity, exhibiting a substantially equal activity and a DMA selectivity of about 2-fold at 320° C., as compared with those of the prior art catalyst at 400° C. By subjecting these zeolites to steaming, DMA selectivity can be further improved without an accompanying lowering in activity.

According to the above-mentioned Japanese Patent Application No. 82768/1983, a mordenite with low Na content exhibits a high activity but low DMA selectivity, whereas steaming treatment can impart a particularly great effect to such a mordenite with low Na content having a relatively low DMA selectivity. For example, in the case of an H-type mordenite containing almost no Na and other metals, the DMA selectivity is slightly above the equilibrium value. However, when subjected to steaming treatment, it exhibits a DMA selectivity surpassing greatly the equilibrium value (DMA 45% or more). Also, for a mordenite containing 0.24% of Na and 3.95% of K before steaming, the DMA yield is 34.7% at a methanol conversion of 82 to 83%, while that after steaming is increased to as much as 59.6%, showing a great increase in DMA selectivity. In either case, the reduction of activity is very small.

The amount of steam used is not particularly limited. It is not necessarily required to use a flowthrough system, and the steaming treatment may also be conducted in a closed system. Further, some effect can also be obtained by heating rapidly a zeolite under a wet condition. The quantity of steam in and the duration of the steaming process depend on the degree of improvement in selectivity to DMA desired.

The degree of the effect of the steaming treatment will vary depending on the partial pressure of water, temperature and time. For example, the conditions of a temperature of 400° C., a pressure of 15 kg/cm$^2$ and a time of 20 hrs. are one example of treating conditions which can produce the greatest effect, and a high effect can be maintained by increasing the pressure or prolonging the treating time when the temperature is lower, or by elevating the temperature or prolonging the treating time when the pressure is lower. However, at a temperature lower than 300° C., the effect is very small, while at a temperature higher than 700° C., the crystalline structure begins to be disadvantageously modified. Although some effect may be obtained even at a low partial pressure of water, it should be 1 atm. or higher. The treating time is preferably longer than 1 hr.

As shown in Example 8, a similar effect can be obtained when the zeolite already used for the reaction is subjected to steam treatment. By steaming of such a spent catalyst, the DMA selectivity can be greatly improved, and the extent of this improvement is equal to or better than that in the case of steaming an unused or virgin catalyst. Also, coke or coke precursors adhering on the catalyst can also be removed by steaming with the result that the activity can be restored to the same level as that of the unused catalyst.

ammonia and methanol containing 50% by weight of ammonia was fed into the tube at a temperature of 400° C., under a pressure of 18 kg/cm$^2$, and at a space velocity VS of 1,600 to 5,800 hr$^{-1}$ to obtain methylamine mixtures with the compositions indicated in the column of "Before steaming" in Table 2.

The same catalyst was contacted with steam of 15 kg/cm$^2$ in the above-mentioned reaction tube at a temperature of 400° C. and a space velocity of 1,000 hr$^{-1}$ for 12 hours, and thereafter nitrogen gas was passed for 30 minutes. Then, the same ammonia/methanol mixture was fed at a temperature of 400° C., under a pressure of 18 kg/cm$^2$, and at a space velocity of 1,000 to 4,000 hr$^{-1}$ to obtain a methylamine mixture with the composition indicated in the column of "After steaming" in Table 2.

Analysis of methylamine as conducted by gas chromatography with the use of a column of styrene polymer beads (trade name: Polapack Q) impregnated with 3% of KOH.

TABLE 2

| | Comparative Example 1 | | | | | |
|---|---|---|---|---|---|---|
| | Before Steaming | | | After Steaming | | |
| Catalyst:<br>Reaction conditions:<br>Steaming conditions: | Space velocity SV (hr$^{-1}$) | Methanol conversion (%) | MMA DMA TMA (wt. %) in all methylamines formed | Space velocity SV (hr$^{-1}$) | Methanol conversion (%) | MMA DMA TMA (wt. %) in all methylamines formed |
| Catalyst: γ-alumina<br>Reaction: | 1600 | 99.3 | 26.3<br>26.2<br>47.5 | 1000 | 97.9 | 24.8<br>24.3<br>50.9 |
| 400° C.<br>18 kg/cm$^2$<br>N/C 1.9<br>Steaming: | 2030 | 98.8 | 25.3<br>25.3<br>49.4 | 1330 | 94.5 | 23.0<br>22.9<br>54.1 |
| 400° C., 15 kg/cm$^2$<br>SV 1000, 20 hrs. | 3100 | 97.1 | 23.6<br>23.7<br>52.7 | 2000 | 86.1 | 21.1<br>19.8<br>59.1 |
| | 5800 | 87.9 | 22.5<br>21.5<br>56.0 | 4000 | 68.7 | 20.7<br>17.0<br>62.3 |

EXAMPLE 1

Crushed naturally-occurring mordenite (100 g) was boiled under reflux in 2 liters of 2N NH$_4$NO$_3$ solution for 20 hours. This operation was repeated three times with renewal of NH$_4$NO$_3$ solution in every operation, and the treated mordenite was dried at 130° C. for 6 hours, which step was followed by calcination at a temperature of 450° C. for 3 hours, to prepare H-type mordenite from which most of metal cations had been removed. This mordenite was extruded into cylinders of 3 mm in diameter to be used as the catalyst in a reaction, which was carried out by the use of the same reaction tube as in Comparative Example 1 by reacting equal weights of ammonia and methanol at a reaction

TABLE 1

| | | Equilibrium Composition | | | | |
|---|---|---|---|---|---|---|
| Temperature (°C.) | Feed ammonia/ methanol N/C (molar ratio) | Equilibrium conversion of methanol (%) | Respective methylamines in all methylamines under equilibrium state (wt. %) | | | DMA Yield $\left( \frac{\text{g DMA formed}}{\text{100g Methanol fed}} \right)$ |
| | | | MMA | DMA | TMA | |
| 400 | 1.9 | 99.6 | 28.5 | 28.1 | 43.4 | 20.0 |
| 350 | 1.9 | 99.8 | 24.0 | 25.3 | 50.7 | 17.6 |
| 330 | 1.9 | 99.8 | 22.2 | 24.0 | 53.8 | 16.6 |
| 320 | 1.9 | 99.8 | 21.2 | 23.3 | 55.4 | 16.0 |
| 310 | 1.9 | 99.9 | 20.3 | 22.6 | 57.1 | 15.5 |

COMPARATIVE EXAMPLE 1

A ½ B stainless-steel reaction tube of 800 mm length was packed with pellets of γ-alumina with a diameter of 4 mm with an alumina content of 18%, and a mixture of temperature of 320° C., under a pressure of 18 kg/cm², and at a space velocity of 1,500 to 6,900 hr⁻¹. The same H-type mordenite was also placed in a similar reaction tube and subjected to steam treatment under the conditions of 400° C., 15 kg/cm², and a space velocity of about 1,000. With the use of this catalyst, the reaction was carried out under the same reaction conditions as set forth above to obtain the methylamine mixtures indicated in Table 3.

EXAMPLE 2

The reaction tests were conducted in the manner described in Example 1 except for the use of commercially available mordenite (cylinders with diameter of 2 mm) and carrying out of the reaction at 310° C. Also, the reaction was carried out under the reaction conditions in Example 1 except for the use of a commercially available mordenite, which had been subjected to steaming under the same conditions as in Example 1, as the catalyst and carrying out the reaction at 310° C. The results are shown in Table 3. The commercially available mordenite herein used may be synthetic mordenite.

into 3 mm diameter cylinders, which were used as the catalyst in the reaction between methanol and ammonia under the conditions of 320° C., 18 kg/cm², SV of 1,000 to 4,300, and N/C of 1.9. The reaction tests were conducted similarly for the same catalyst subjected with steaming under the same conditions as in Example 2 to obtain the results shown in Table 4.

EXAMPLE 4

With the use as a catalyst of naturally-occurring erionite extruded into cylinders of 2-mm diameter, the reaction of methanol and ammonia was carried out under the conditions of 400° C., 18 kg/cm², SV of 2,000 to 5,500, and N/C of 1.9. The reaction tests were conducted similarly for the naturally-occurring erionite applied with steaming under the same conditions as in Example 2 to obtain the results shown in Table 4.

EXAMPLE 5

Naturally-occurring clinoptilolite sieved into 5-6 mesh (100 g) was maintained in 500 ml of 1N hydrochloric acid at room temperature for 20 hours, washed with water, dried and calcined at 450° C. for 4 hours.

TABLE 3

| | Before Steaming | | | After Steaming | | |
|---|---|---|---|---|---|---|
| Catalyst:<br>Reaction conditions:<br>Steaming conditions: | Space velocity SV (hr⁻¹) | Methanol conversion (%) | MMA DMA TMA (wt. %) in all methylamines formed | Space velocity SV (hr⁻¹) | Methanol conversion (%) | MMA DMA TMA (wt. %) in all methylamines formed |
| | | | Example 1 | | | |
| Catalyst: | 1570 | 99.5 | 20.9 | 1560 | 99.0 | 27.9 |
| Natural | | | 22.2 | | | 39.4 |
| H-type | | | 56.9 | | | 32.8 |
| mordenite | 2110 | 99.1 | 21.0 | 2070 | 97.2 | 28.9 |
| Reaction: | | | 22.2 | | | 42.9 |
| 320° C. | | | 56.8 | | | 28.1 |
| 18 kg/cm² | 3160 | 97.0 | 21.9 | 3230 | 84.0 | 35.2 |
| N/C 1.9 | | | 23.2 | | | 44.8 |
| Steaming: | | | 54.9 | | | 20.1 |
| 400° C., 15 kg/cm² | 6470 | 86.6 | 25.6 | 6360 | 57.7 | 46.2 |
| SV 1000, 20 hrs. | | | 24.5 | | | 39.1 |
| | | | 50.0 | | | 14.7 |
| | | | (bis) Example 2 | | | |
| Catalyst: | 1500 | 98.4 | 21.5 | 1580 | 96.1 | 28.7 |
| Synthetic | | | 22.5 | | | 40.3 |
| H-type | | | 56.0 | | | 31.1 |
| mordenite | 2110 | 96.4 | 23.7 | 2150 | 95.1 | 30.5 |
| Reaction: | | | 23.8 | | | 45.5 |
| 310° C., | | | 52.5 | | | 24.0 |
| 18 kg/cm² | 3410 | 89.6 | 26.8 | 3120 | 89.1 | 33.7 |
| N/C 1.9 | | | 26.4 | | | 48.7 |
| Steaming: | | | 46.8 | | | 17.6 |
| 400° C., 15 kg/cm² | 6890 | 72.7 | 34.1 | 6260 | 73.2 | 44.0 |
| SV 1000, 20 hrs. | | | 29.3 | | | 44.3 |
| | | | 36.6 | | | 11.8 |

EXAMPLE 3

Crushed naturally-occurring mordenite (100 g) was immersed in 500 ml of 1N hydrochloric acid and left to stand at 40° C. for 30 hours. Then, the treated mordenite was washed with water, dried and calcined at 450° C. for 4 hours to prepare a mordenite containing 0.7% of Na, 1.4% of K and small quantities of other elements such as Fe, Mg and Ca. The mordenite was extruded Using this as the catalyst, the reaction of methanol and ammonia was carried out in the same reaction tube as employed in Comparative Example 1 under the conditions of 350° C., 18 kg/cm², SV of 1,000 to 4,300, and N/C of 1.9. The same reaction tests were conducted for the aforesaid catalyst which had been contacted with steam at 450° C. under a pressure of 8 kg/cm² for 10 hours to obtain the results shown in Table 4.

TABLE 4

| Catalyst:<br>Reaction conditions:<br>Steaming conditions: | Before Steaming | | | After Steaming | | |
|---|---|---|---|---|---|---|
| | Space velocity SV (hr$^{-1}$) | Methanol conversion (%) | MMA DMA TMA (wt. %) in all methylamines formed | Space velocity SV (hr$^{-1}$) | Methanol conversion (%) | MMA DMA TMA (wt. %) in all methylamines formed |
| *Example 3* | | | | | | |
| Catalyst: Mordenite | 1070 | 98.6 | 31.6 | 1070 | 98.4 | 33.4 |
| Reaction: | | | 46.9 | | | 54.4 |
| 320° C. | | | 21.5 | | | 12.2 |
| 18 kg/cm² | 1430 | 96.4 | 33.4 | 1430 | 95.8 | 34.7 |
| N/C 1.9 | | | 50.9 | | | 56.3 |
| Steaming: | | | 15.6 | | | 9.0 |
| 400° C., 15 kg/cm² | 2140 | 91.5 | 36.1 | 2140 | 89.5 | 37.1 |
| SV 1000, 20 hrs. | | | 52.4 | | | 56.8 |
| | | | 11.5 | | | 6.1 |
| | 4280 | 74.4 | 44.3 | 4280 | 68.5 | 45.6 |
| | | | 48.2 | | | 50.8 |
| | | | 7.5 | | | 3.6 |
| *(bis) Example 4* | | | | | | |
| Catalyst: Erionite | 2120 | 98.4 | 28.7 | 2020 | 95.7 | 32.0 |
| Reaction: | | | 28.5 | | | 32.4 |
| 380° C. | | | 42.8 | | | 35.6 |
| 18 kg/cm² | 2760 | 96.2 | 31.3 | 2420 | 92.2 | 34.3 |
| N/C 1.9 | | | 29.3 | | | 34.1 |
| Steaming: | | | 39.4 | | | 31.6 |
| 400° C., 15 kg/cm² | 4240 | 87.0 | 33.9 | 4010 | 84.1 | 35.2 |
| SV 1000, 20 hrs. | | | 30.6 | | | 35.3 |
| | | | 35.4 | | | 29.5 |
| | 5490 | 81.4 | 35.6 | 5210 | 76.1 | 38.0 |
| | | | 31.2 | | | 35.1 |
| | | | 33.2 | | | 26.9 |
| *(bis) Example 5* | | | | | | |
| Catalyst: Clinoptilolite | 1060 | 97.1 | 28.1 | 1010 | 94.8 | 33.1 |
| | | | 30.5 | | | 33.8 |
| Reaction: | | | 41.4 | | | 33.1 |
| 350° C. | 1410 | 94.7 | 30.6 | 1430 | 92.5 | 33.9 |
| 18 kg/cm² | | | 32.3 | | | 35.4 |
| N/C 1.9 | | | 37.1 | | | 30.7 |
| Steaming: | 2120 | 88.2 | 32.6 | 2150 | 85.1 | 35.1 |
| 450° C., 5 kg/cm² | | | 34.5 | | | 38.3 |
| SV 1000, 10 hrs. | | | 32.9 | | | 26.6 |
| | 4220 | 72.1 | 34.7 | 4280 | 67.2 | 37.0 |
| | | | 34.3 | | | 38.5 |
| | | | 31.0 | | | 24.5 |

EXAMPLE 6

Naturally-occurring mordenite crushed to about 6 mm cubes (1 kg) was placed stationarily in 5 liters of 1N hydrochloric acid at 40° C. for 20 hours and then washed with water and dried, after which it was subjected to calcination at 450° C. for 4 hours. A part of the product was placed in the same reaction tube as that employed in Comparative Example 1, into which ammonia/methanol mixture was fed to carry out the reaction under the conditions of 320° C., 18 kg/cm², a SV of 1,000 to 4,300 lit./hr, and N/C of 1.9.

Also, a part of the product was contacted with steam at 400° to 50° C., under a pressure of 5 to 15 kg/cm² and at a SV of 1,000 for 9 to 72 hours, and using the respective catalysts obtained, reactions were conducted to obtain the results shown in Table 5.

TABLE 5

*(bis) Example 6*

Reaction test results (Reaction conditions: 320° C., 18 kg/cm², Ammonia/Methanol = 1.9 mole/mole)

| Steaming conditions (SV = 1000) | | | | | | | |
|---|---|---|---|---|---|---|---|
| Temperature (°C.) | Partial pressure of steam (kg/cm²) | Treatment time (hr) | Space velocity SV (hr$^{-1}$) | Methanol conversion (%) | Respective methylamines in all methylamines formed (wt. %) | | |
| | | | | | MMA | DMA | TMA |
| — | — | — | 1030 | 98.3 | 30.1 | 43.6 | 26.3 |
| | (no treatment) | | 1380 | 96.8 | 31.8 | 48.5 | 19.7 |
| | | | 2080 | 93.7 | 34.0 | 51.9 | 14.1 |
| | | | 4190 | 76.2 | 42.1 | 48.5 | 9.3 |
| 400 | 15 | 20 | 1050 | 98.3 | 32.2 | 52.9 | 14.9 |
| | | | 1410 | 96.7 | 33.3 | 55.6 | 11.2 |
| | | | 2120 | 91.5 | 35.3 | 57.4 | 7.3 |
| | | | 4140 | 72.9 | 43.1 | 52.4 | 4.5 |
| 400 | 5 | 20 | 1040 | 98.6 | 32.0 | 46.6 | 21.5 |
| | | | 1400 | 96.8 | 33.4 | 50.4 | 16.2 |
| | | | 2130 | 91.2 | 35.3 | 53.2 | 11.5 |
| | | | 3990 | 79.1 | 41.9 | 51.4 | 6.7 |

TABLE 5-continued (bis) Example 6

Reaction test results (Reaction conditions: 320° C., 18 kg/cm$^2$, Ammonia/Methanol = 1.9 mole/mole)

| Steaming conditions (SV = 1000) | | | | | | | |
|---|---|---|---|---|---|---|---|
| Temperature (°C.) | Partial pressure of steam (kg/cm$^2$) | Treatment time (hr) | Space velocity SV (hr$^{-1}$) | Methanol conversion (%) | \multicolumn{3}{c}{Respective methylamines in all methylamines formed (wt. %)} |
| | | | | | MMA | DMA | TMA |
| 400 | 5 | 48 | 1030 | 98.4 | 32.3 | 50.0 | 17.6 |
| | | | 1400 | 96.0 | 33.6 | 53.4 | 13.0 |
| | | | 2060 | 89.8 | 35.6 | 54.6 | 9.8 |
| | | | 4250 | 75.3 | 42.2 | 52.5 | 5.3 |
| 400 | 5 | 72 | 1040 | 98.1 | 31.9 | 51.5 | 16.6 |
| | | | 1450 | 95.8 | 33.3 | 53.4 | 13.3 |
| | | | 2040 | 89.4 | 35.0 | 56.1 | 8.9 |
| | | | 4260 | 72.2 | 42.5 | 52.5 | 5.1 |
| 550 | 5 | 20 | 1040 | 97.9 | 32.7 | 53.3 | 14.0 |
| | | | 1390 | 95.8 | 33.9 | 57.0 | 9.1 |
| | | | 2080 | 89.1 | 36.0 | 58.7 | 5.3 |
| | | | 4180 | 71.6 | 43.5 | 53.4 | 3.1 |
| 400 | 15 | 8 | 1050 | 98.5 | 32.3 | 47.0 | 20.7 |
| | | | 1400 | 96.7 | 33.6 | 51.1 | 15.3 |
| | | | 2070 | 92.0 | 35.7 | 54.2 | 10.1 |
| | | | 4200 | 75.4 | 42.3 | 51.9 | 5.8 |

EXAMPLE 7

Naturally-occurring mordenite crushed into about 6 mm squares (100 g) was boiled under reflux in 1.5 liters of 0.5N sodium hydroxide solution for 4 hours, thoroughly washed with water and maintained in 500 ml of 1N hydrochloric acid at 40° C. for 24 hours. The mordenite thus treated was washed with water, dried and calcined at 450° C. for 4 hours to prepare a mordenite catalyst containing 0.24% of Na, 3.95% of K and small amounts of other metals such as Ca and Mg. This catalyst was placed in the same reaction tube as that used in Comparative Example 1, and the reaction was carried out by passing methanol/ammonia therethrough under the conditions of 320° C., 18 kg/cm$^2$, SV of 1,000 to 4,200 hr$^{-1}$, and N/C of 1.9.

The same reaction tests were conducted for the catalyst which had been contacted with steam under the conditions of 400° C., 15 kg/cm$^2$ and 20 hours to obtain the results shown in Table 6.

EXAMPLE 8

Naturally-occurring mordenite crushed into about 6 mm squares (100 g) was held in 1N ammonia nitrate solution at 20° C. for 16 hours, washed with water, dried and calcined at 450° C. for 4 hours. The resultant catalyst was placed in the same reaction tube as that used in Comparative Example 1, and the reaction was carried out by feeding ammonia/methanol mixture under the conditions of 320° C., 18 kg/cm$^2$ and N/C of 1.9. The reaction products at SV of 1,000 to 4,400 were analyzed, respectively. After the reaction was continued under the same conditions at 320° C. and SV of 1,000 for 700 hours, the reaction products obtained at 320° C. and at SV of 1,000 to 4,100 were analyzed, respectively. After termination of the reaction, steam was subsequently passed through the catalyst layer under the conditions of 400° C., 15 kg/cm$^2$ and SV of 1,000. Then, methanol/ammonia was introduced again and the reaction products obtained under the conditions of 320° C., 18 kg/cm$^2$ and N/C of 1.9 were analyzed, respectively. The respective reaction results are shown in Table 7.

TABLE 6

Example 7

| Catalyst: Reaction conditions: Steaming conditions: | Before Steaming | | | After Steaming | | |
|---|---|---|---|---|---|---|
| | Space velocity SV (hr$^{-1}$) | Methanol conversion (%) | MMA DMA TMA (wt. %) in all methylamines formed | Space velocity SV (hr$^{-1}$) | Methanol conversion (%) | MMA DMA TMA (wt. %) in all methylamines formed |
| Catalyst: | 1010 | 82.9 | 30.1 | 1030 | 81.8 | 36.4 |
| Mordenite Na 0.24% | | | 34.7 | | | 59.6 |
| K 3.95% | | | 35.1 | | | 3.9 |
| Reaction: | 1420 | 73.4 | 33.9 | 1320 | 72.9 | 38.3 |
| 320° C. | | | 39.9 | | | 58.3 |
| 18 kg/cm$^2$ | | | 26.2 | | | 3.3 |
| N/C 1.9 | 2060 | 63.7 | 36.8 | 2090 | 59.2 | 42.9 |
| Steaming: | | | 38.5 | | | 54.8 |
| 400° C., 15 kg/cm$^2$ | | | 24.7 | | | 2.3 |
| SV 1000, 20 hrs. | 4100 | 44.8 | 44.5 | 4210 | 40.3 | 52.9 |
| | | | 33.6 | | | 45.8 |
| | | | 21.9 | | | 1.3 |

TABLE 7

Example 8

Reaction test results (Reaction conditions: 320° C., 18 kg/cm², Ammonia/Methanol = 1.9 mole/mole)

| Catalyst (mordenite) | Space velocity SV (hr$^{-1}$) | Methanol conversion (%) | Respective methylamines in all methylamines formed (wt. %) | | |
|---|---|---|---|---|---|
| | | | MMA | DMA | TMA |
| No steaming Unused | 1090 | 99.1 | 28.8 | 40.1 | 31.1 |
| | 1490 | 98.7 | 30.1 | 42.4 | 27.5 |
| | 2220 | 96.2 | 32.8 | 48.0 | 19.2 |
| | 4360 | 82.6 | 39.4 | 49.2 | 11.4 |
| No steaming Used for 700 hrs. (340° C.) | 990 | 96.2 | 29.6 | 40.9 | 29.5 |
| | 1360 | 92.9 | 32.6 | 44.7 | 22.7 |
| | 1920 | 86.3 | 35.8 | 48.4 | 15.9 |
| | 4100 | 69.4 | 44.1 | 48.2 | 7.7 |
| No steaming, used for 700 hrs, and then subjected to steaming (400° C. 15 kg/cm² 24 hrs.) | 1063 | 98.9 | 33.1 | 52.3 | 14.7 |
| | 1990 | 94.7 | 35.5 | 57.2 | 7.2 |

What is claimed is:

1. In a process for production of dimethylamine by a gas phase reaction of ammonia and methanol over a catalyst of a zeolite selected from the group consisting of mordenite, clinoptilolite, and erionite, wherein a mixture of methylamines is produced, the improvement wherein said catalyst is previously and separately from said reaction of ammonia and methanol contacted with an atmosphere comprising steam at a temperature of from 250° to 700° C., thereby to increase the content of dimethylamine in the methylamine mixture produced above the content of dimethylamine resulting from said reaction over the catalyst in the absence of such contact of the catalyst with steam.

2. The process according to claim 1, wherein the catalyst is mordenite, clinoptilolite or erionite which has not yet been used for the reaction of ammonia and methanol.

3. The process according to claim 1, wherein the catalyst is mordenite, clinoptilolite or erionite which has already been used for the reaction of ammonia and methanol.

4. The process according to claim 1, wherein the catalyst is contacted with the atmosphere comprising steam under a steam pressure of 1 to 70 atm. for 1 to 400 hours at a temperature of 350° to 500° C.

5. The process according to claim 1, wherein the catalyst is contacted with the atmosphere comprising steam under a pressure of 5 to 30 atm. for 10 to 30 hours at a temperature of 350° to 500° C.

6. The process according to claim 1, wherein the catalyst has an alkali metal content adjusted to from 1 to 7% by weight as calculated on the basis of the oxide thereof.

7. The process according to claim 1, wherein the reaction of ammonia and methanol is a continuous reaction conducted under the conditions of a temperature of 250° to 500° C., a pressure of 1 to 50 atm., N/C of 0.2 to 6 and a space velocity of 360 to 18,000 hr$^{-1}$ as calculated based on the data under 1 atm. and 0° C.

8. The process according to claim 1, wherein the zeolite is mordenite.

* * * * *